Feb. 19, 1935.    W. SAMUELS    1,991,580
AUXILIARY SPRING
Filed Jan. 4, 1934
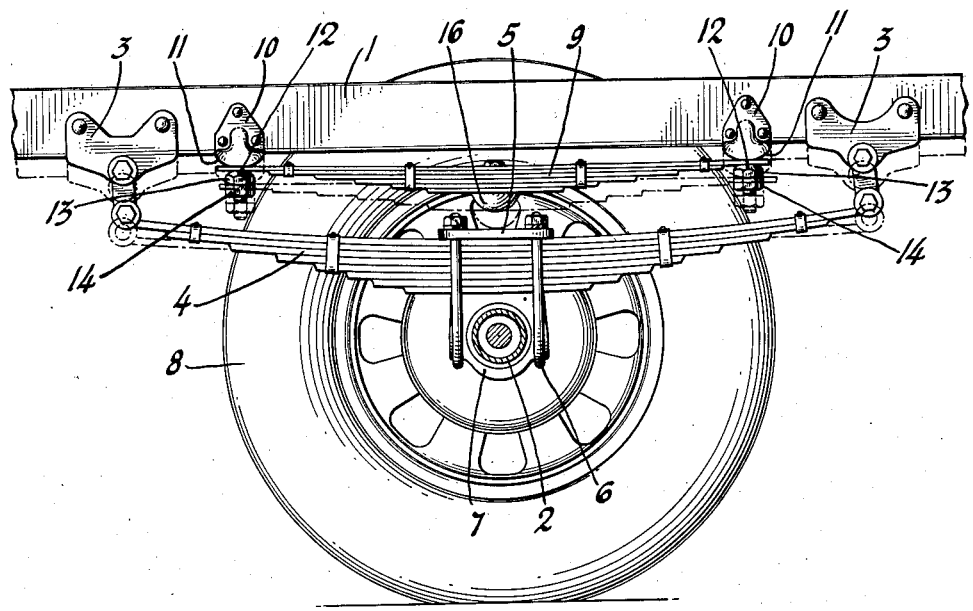
Fig. 1
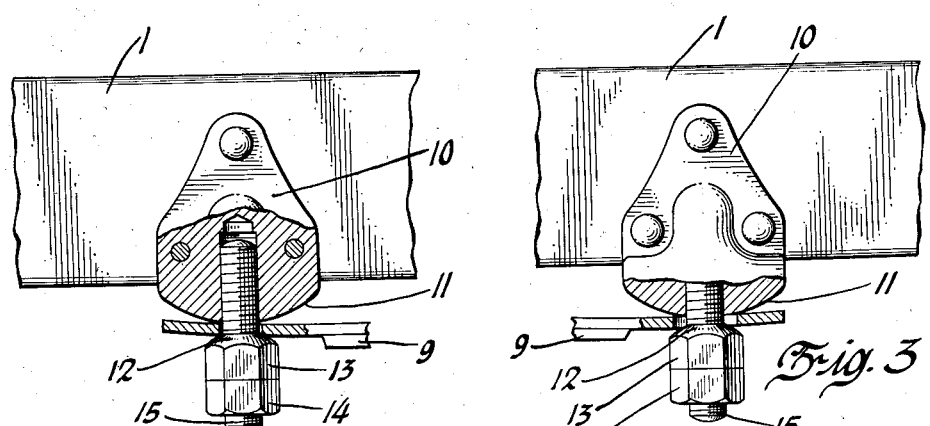
Fig. 2
Fig. 3
Inventor
William Samuels Patented Feb. 19, 1935

1,991,580

UNITED STATES PATENT OFFICE 1,991,580

AUXILIARY SPRING

William Samuels, Detroit, Mich., assignor to General Motors Corporation, Detroit, Mich., a corporation of Delaware Application January 4, 1934, Serial No. 705,168

2 Claims. (Cl. 267—45)

This invention has to do with vehicle spring suspension. In the case of heavy duty trucks, for example, the practice has been to provide a very stiff spring designed particularly to take care of maximum load requirements with the result that a rough ride is had when the load is light. To afford a smooth and comfortable ride throughout the load range, it is here proposed to provide a duplex spring arrangement involving a main load supporting spring for action at all times, but more resilient than the conventional heavy duty spring, to give a soft ride for light loads and a helper spring which comes into action to carry a portion of the load after a given deflection of the main spring. Thus the supplemental spring is out of play and the main spring alone carries a light load, while the combined resistance of both springs is available for heavy loads.

An important feature of the present construction is that it has been designed especially with the view of eliminating need for material alteration and rearrangement of conventional parts, which is to say, the main load supporting spring is connected with the chassis frame and axle, as in the past, but there has been added a helper spring assembly which can be easily and conveniently mounted wholly on the chassis frame and free of direct connection with the axle. As so incorporated in the chassis frame, the opposite ends of the helper spring are held in a manner to accommodate flexing of the spring when an intermediate portion thereof, spaced from the axle in the unloaded position of the parts, is engaged by the axle after a given deflection of the main spring. The construction enables easy conversion of a light duty truck for heavy duty work, without disturbing the original spring assembly.

A better understanding of the invention can be had from the accompanying drawing, wherein Figure 1 is a fragmentary view showing in side elevation a portion of a vehicle chassis frame supported through springs from an axle shown in section, and Figures 2 and 3 are detail views with parts in section, showing the connections for opposite ends of the helper spring.

Referring to the drawing, the reference numeral 1 indicates one of a pair of side bars of a chassis frame, both of which are flexibly mounted upon an axle 2 by the spring arrangement to be described. Each side bar carries a pair of longitudinally spaced brackets 3, by which is connected the opposite ends of a multiple leaf semi-elliptical spring 4, which constitutes the main load supporting spring. At an intermediate point the spring 4 is engaged on its upper surface by a clamp plate 5, secured to the axle 2 by a pair of U-bolts 6, embracing a split axle block 7. The axle shown in the drawing is of the driving type and carries at opposite ends a pair of road wheels 8, only the farther one of which is shown in the drawing.

Extending longitudinally of the frame in vertical alinement with the main load supporting spring 4 is the helper spring assembly, which includes a multiple leaf spring 9, supported by and connected at opposite ends to the chassis frame by a pair of frame brackets 10, riveted or otherwise secured in place. The underside of each bracket 10 is provided with a curved or arcuate bearing surface 11 for engagement with the top of the main leaf of the spring pack 9. Engaging the underside of the spring leaf is a rounded surface 12 on a nut 13, which is secured by a lock nut 14 on a threaded stud 15 extending upwardly through an opening in the spring and into threaded engagement with a recess in the bracket 10. The curved surfaces 11 and 12 thus provide oppositely flared bearings which receive the spring therebetween and provide for easy rocking of the spring end upon spring deflection.

In the case of the connection for one end of the spring, as shown in detail in Figure 2, the opening in the spring that receives the attachment stud is only slightly larger than the diameter of the stud while the opening in the opposite end of the spring consists of an elongated slot as in Figure 3 to permit relative movement upon spring elongation. Thus while the connection at one end permits relative rocking and longitudinal movement, the connection at the opposite end accommodates rocking movement only and locates the assembly against displacement.

At an intermediate point and directly above the plate 15, the helper spring 9 carries a bumper 16 in the form of a plate, having a downwardly extending rounded boss which in the unloaded position of the parts, as shown by full lines in the drawing, is spaced considerably above and out of engagement with the plate 5. In this relation of parts the main spring 4, as is obvious, transmits the full load of the chassis frame 1 to the axle 2. However, upon application of load, the main spring 4 is deflected and when the parts move to the position indicated by broken lines in Figure 1, the bumper 16 is brought into engagement with the plate 5 and thereafter a part of the load is carried by the helper spring 9 and transmitted directly to the axle through the rigid mounting of the main spring thereon. Thus both springs cooperate to carry heavy loads, but the resistance of one is eliminated to give a smoother ride when the vehicle is lightly loaded.

I claim:

1. In a vehicle, a main load supporting spring, a secondary spring adapted to assist in supporting load after a predetermined load application, a pair of spaced frame brackets each having a longitudinally curved surface for progressive engagement with the opposite ends of the secondary spring upon flexure thereof, headed locating studs projecting from said surfaces and passing through openings in the spring ends, one of which openings is elongated to accommodate spring elongation, and a bumper carried intermediate the ends of said secondary spring.

2. In a vehicle, a main load supporting spring, a helper spring associated therewith and adapted for action after a given loading of the main spring, a pair of mounting brackets for opposite ends of the helper spring each having a pair of oppositely flared bearing surfaces engaging opposite faces of the spring end, and a bumper carried by the helper spring intermediate its ends through which deflecting force is received.

WM. SAMUELS.